F. J. SLIFKA.
NON-PUNCTURABLE RING FOR PNEUMATIC TIRES.
APPLICATION FILED MAR. 17, 1916.
1,304,817.
Patented May 27, 1919.
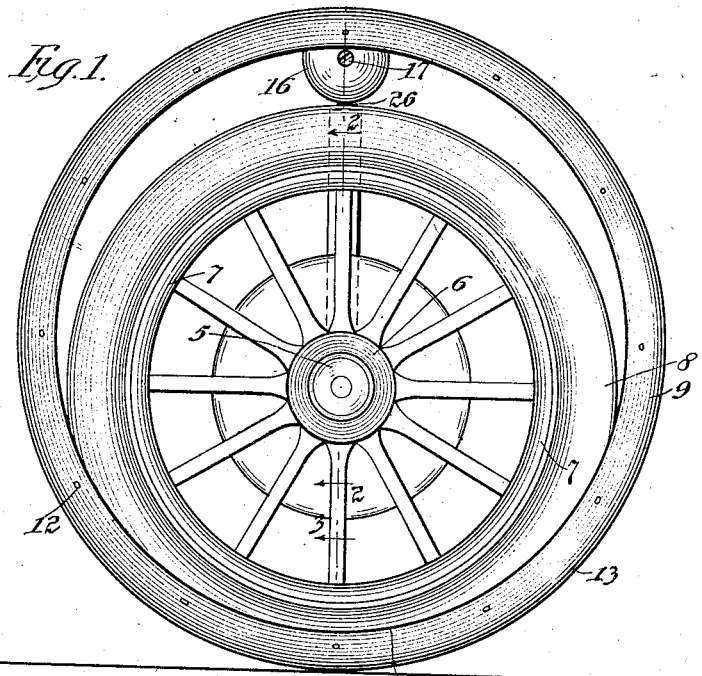
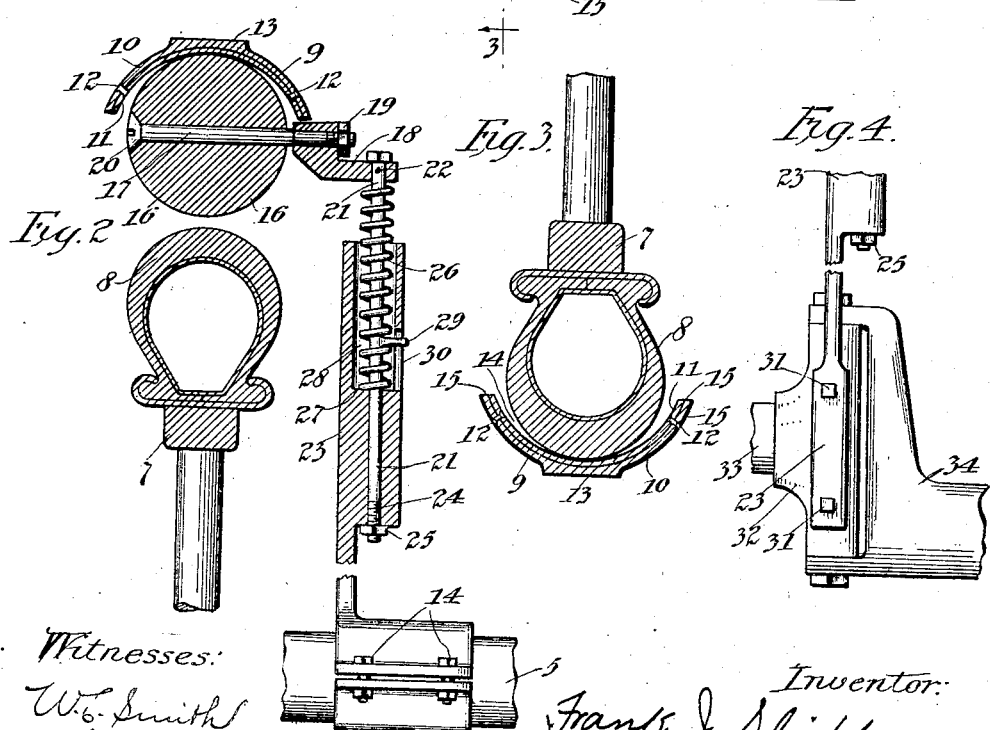
Witnesses:
Inventor:
Frank J. Slifka
by Jno. G. Elliott, Atty.

UNITED STATES PATENT OFFICE.

FRANK J. SLIFKA, OF CHICAGO, ILLINOIS.

NON-PUNCTURABLE RING FOR PNEUMATIC TIRES.

1,304,817.  Specification of Letters Patent.  Patented May 27, 1919.

Application filed March 17, 1916. Serial No. 84,916.

*To all whom it may concern:*

Be it known that I, FRANK J. SLIFKA, a citizen of the United States, and resident of Chicago, in the county of Cook and State of Illinois, have invented certain new and useful Improvements in Non-Puncturable Rings for Pneumatic Tires, of which the following is a full, clear, and exact specification.

This invention relates to improvements in non-puncturable rings for pneumatic tires.

The prime object of this invention broadly stated, is to provide a non-puncturable ring for the pneumatic tires of automobiles and other vehicles, which is adapted to rotate with and form a traction surface for such tires.

More specifically stated the object of my invention is to provide a non-puncturable ring for automobile tires, the diameter and cross-sectional form of which is such that it is rotatable with and upon an axis eccentric to that of the tire, and that the surface of the tire exposed to puncture is isolated in its entirety therefrom.

A further object of my invention is to provide a simple and effective means for permanently constantly maintaining in a vertical position the axis of a surrounding ring of greater diameter on a vertical line passing through the axis of the tire.

With these ends in view, my invention finds embodiment in certain features of novelty in the construction, combination and arrangement of parts by which the said objects and certain other objects are attained, all as hereinafter fully described with reference to the accompanying drawings, and more particularly pointed out in the claims.

In said drawing:

Figure 1 illustrates in side elevation the rear traction wheel for an automobile or other wheel provided with a pneumatic tire in its operative position in and with relation to a non-puncturable armor therefor, in which my invention finds its embodiment.

Fig. 2 is a detail vertical section taken on the line 2—2 of Fig. 1.

Fig. 3 is a similar section taken on the line 3—3 of Fig. 1, and—

Fig. 4 is a detail side elevation showing the means for securing the armor of my invention in its operative position for the front wheels of an automobile or other vehicle.

Similar characters of reference indicate the same parts in the several figures of the drawings.

5 indicates the rear axle of an automobile or other vehicle wheel on which rotates the hub 6 of a wheel 7 provided with a pneumatic tire 8 of any construction ordinarily used.

Surrounding the tire 8 is a ring 9 of substantially greater diameter than the tire constructed of non-puncturable material, preferably sheet steel in one continuous piece, forming the outer surface 10 of the tread, the inner surface of which is provided with a lining 11 of any material adapted to prevent the tire from slipping in the ring and vice versa, such for example as a strip of fiber, rubber, cloth, leather, etc., secured to the ring 9 by means of rivets 12, the tread of the tire being preferably flat as indicated at 13.

The diameter of ring 9 is substantially greater than that of the wheel including the tire and is provided with an inner convex surface formed on the arc of a circle of greater diameter than of the tire so that when in its operative position supporting the tire its side edges 15—15 extend well up along the sides of the tire and outwardly therefrom as shown in the drawings when the tire is seated therein.

Interposed between the top surface of the tire and the ring is an anti-friction roller 16 preferably spherical in form pivoted upon a screw threaded bolt 17 supported from a bracket 18, but as shown, is free to turn in the bracket and be held against accidental detachment by a nut 19, which also provides a means for adjustably centering the roller 16 with reference to both the tire and the ring.

The pivoting bolt 17 may be provided with a notched head 20 counter-sunk in the spherical roller, and be screw-threaded in the bracket as well as for the purposes of the nut 19, but my invention is not limited either to the particular form of the roller or to the means for its pivotal support.

When the non-puncturable ring 9 is used as an armor for the rear wheel tires of an automobile or other vehicle, bracket 18 is fixed to a rod 21 by means of a pin 22, which rod passes through a post 23, supported from the rear axle 5 and secured thereto by bolts 14, and is provided with screw-threads 24 on which is a nut 25.

The bracket is yieldingly supported in its operative position by means of a spring 26 coiled about the rod 21, one end of which bears against the bracket and the other end against the bottom 27 of a chamber 28 formed in the post and confining a substantial portion of the length of the spring, the tension of which is regulated by the adjustment of the nut 25 on the rod 21.

As a means for limiting the length of expansion and contraction of the spring 26 the rod is provided with an arm 29 projecting laterally therefrom between the walls of a slot 30 in the cored out portion, or chamber 28 of the post.

In short the roller 16 yieldingly suspends the armor in its operative position in permanently yielding contact with the tread of the wheel and on a line passing through the axis of the roller and of the wheel.

In other words the roller and its adjustable yielding support provide a means yieldingly suspending the ring, locating its axis eccentric to the wheel, and maintaining that axis substantially fixed, with the result that the ring is prevented from lagging behind or moving forwardly or rearwardly with reference to the wheel and this without any necessity for maintaining the roller in constant frictional contact with the tire.

When the device in which my invention finds its embodiment is applied to the front axle of a vehicle and particularly an automobile, the post 23 is supported from and rigidly secured by nut-bolts 31 to the knuckle joint 32 of the movable member 33 of the front axle 34.

In this connection it is however proper to observe that my invention is not limited to the specific form of post and other devices shown in connection therewith for supporting the roller 16, but includes any form of support for the roller, but preferably one which is provided with means for adjusting the roller in order that the friction between the roller and the peripheral surface of the tire is reduced to a minimum and for maintaining the axis of the ring on substantially a vertical line passing through the roller and the axis of the wheel, or in other words by which the ring is compelled to rotate about a substantially fixed axis eccentric to that of the tire.

Having described my invention what I claim and desire to secure by Letters Patent is:

1. The combination with a vehicle traction wheel provided with a pneumatic tire, of a concavo convex punctureless ring of greater diameter than and surrounding said tire, and an adjustable yielding means for centering the tire and maintaining the tire in permanent contact with the convex concave bottom surface of the ring.

2. The combination with a vehicle traction wheel of a surrounding punctureless ring of greater diameter than and rotatable with said wheel, a rotatable means interposed between the wheel and the ring in contact with the ring, and means for yieldingly supporting said rotatable means from the axle of the vehicle.

In witness whereof I have hereunto set my hand and affixed my seal this 14th day of March, A. D. 1916.

FRANK J. SLIFKA. [L. S.]

Witnesses:
MILDRED ELSNER,
JNO. G. ELLIOTT.

Copies of this patent may be obtained for five cents each, by addressing the "Commissioner of Patents, Washington, D. C."